United States Patent
Shetty et al.

(10) Patent No.: US 9,792,428 B2
(45) Date of Patent: Oct. 17, 2017

(54) DYNAMIC PASSWORD GENERATION

(71) Applicant: INTERNATIONAL BUSINESS MACHINES CORPORATION, Armonk, NY (US)

(72) Inventors: Ashrith Shetty, Karnataka (IN); Rohit Shetty, Karnataka (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/417,041

(22) Filed: Jan. 26, 2017

(65) Prior Publication Data
US 2017/0177856 A1 Jun. 22, 2017

Related U.S. Application Data

(63) Continuation of application No. 14/972,139, filed on Dec. 17, 2015.

(51) Int. Cl.
*G06F 21/46* (2013.01)
*H04L 29/06* (2006.01)

(52) U.S. Cl.
CPC .......... *G06F 21/46* (2013.01); *H04L 63/083* (2013.01); *H04L 63/10* (2013.01)

(58) Field of Classification Search
CPC .......... H04L 63/0838; H04L 63/0846; H04L 9/3228; H04L 9/0863; H04L 9/3226;
(Continued)

(56) References Cited

U.S. PATENT DOCUMENTS

| 5,774,525 A | 6/1998 | Kanevsky et al. |
| 6,094,721 A | 7/2000 | Eldridge et al. |

(Continued)

FOREIGN PATENT DOCUMENTS

KR    1020070075642 A    7/2007

OTHER PUBLICATIONS

Garrett Groff, "Crytographically Random Password Generator", CodeGuru.com, Published Dec. 12, 2007, Retrieved From http://www.codeguru.com/csharp/csharp/cs_misc/security/article.php/c14557/Cryptographically-Random-Password-Generator.htm.*
(Continued)

*Primary Examiner* — Chau Le
(74) *Attorney, Agent, or Firm* — Anthony R. Curro

(57) ABSTRACT

Providing access to electronic information. A first password string and a rule for configuring and generating a second password string from the first password string, are received from a user. The rule specifies a dynamic element to insert at a position in the first password string, based on first contextual information associated with the user. The value of the specified dynamic element is determined based on second contextual information associated with the user. Upon receiving a third password string, the second password string is configured and generated from the first password string, based on the rule, by: selecting the specified dynamic element based on the first contextual information; inserting the selected dynamic element in the first password string; and determining the value of the selected dynamic element based on the second contextual information. If the third password string matches the second password string, access to the electronic information is granted.

16 Claims, 8 Drawing Sheets

(58) Field of Classification Search
CPC ....... H04L 9/0869; G06F 21/31; G06F 21/46; H04W 12/06
See application file for complete search history.

(56) References Cited

U.S. PATENT DOCUMENTS

| | | | |
|---|---|---|---|
| 6,209,104 B1 | 3/2001 | Jalili | |
| 6,643,784 B1 | 11/2003 | McCulligh | |
| 6,678,707 B1 | 1/2004 | Butler | |
| 7,093,282 B2 | 8/2006 | Hillhouse | |
| 7,171,564 B2* | 1/2007 | Kelley | G06F 21/32 380/265 |
| 7,386,731 B2 | 6/2008 | Sanai et al. | |
| 7,523,318 B2 | 4/2009 | Goal | |
| 7,552,469 B2 | 6/2009 | Diffie et al. | |
| 7,761,384 B2 | 7/2010 | Madhogarhia | |
| 7,873,995 B2 | 1/2011 | Bagga et al. | |
| 7,890,768 B2* | 2/2011 | Singh | G06F 21/31 705/18 |
| 7,899,753 B1* | 3/2011 | Everhart | G06Q 20/0855 705/64 |
| 7,904,946 B1* | 3/2011 | Chu | H04L 63/067 726/10 |
| 8,239,677 B2 | 8/2012 | Colson | |
| 8,311,190 B2 | 11/2012 | Caceres et al. | |
| 8,739,278 B2 | 5/2014 | Varghese | |
| 8,756,650 B2 | 6/2014 | Wolfson et al. | |
| 8,856,904 B2* | 10/2014 | Chougle | G06F 21/46 713/168 |
| 8,954,738 B2 | 2/2015 | Asokan et al. | |
| 9,218,480 B2 | 12/2015 | Fakhrai et al. | |
| 2003/0037262 A1 | 2/2003 | Hillhouse | |
| 2006/0143450 A1 | 6/2006 | Airody Udupa et al. | |
| 2006/0248344 A1 | 11/2006 | Yang | |
| 2007/0186115 A1 | 8/2007 | Gao et al. | |
| 2007/0250920 A1 | 10/2007 | Lindsay | |
| 2009/0089869 A1 | 4/2009 | Varghese | |
| 2009/0282258 A1 | 11/2009 | Burke et al. | |
| 2011/0225625 A1 | 9/2011 | Wolfson et al. | |
| 2012/0137340 A1 | 5/2012 | Jakobsson et al. | |
| 2012/0151566 A1 | 6/2012 | Lin et al. | |
| 2013/0227661 A1 | 8/2013 | Gupta et al. | |
| 2013/0318580 A1 | 11/2013 | Gudlavenkatasiva et al. | |
| 2013/0318596 A1 | 11/2013 | Huang et al. | |
| 2014/0244511 A1 | 8/2014 | Weller et al. | |
| 2015/0033303 A1 | 1/2015 | ValBlon et al. | |
| 2015/0172294 A1 | 6/2015 | Bittner et al. | |
| 2016/0080366 A1 | 3/2016 | Agarwal | |

OTHER PUBLICATIONS

IBM, List of IBM Patents or Patent Applications Treated as Related, Appendix P, dated Jan. 30, 2017, 2 pages.
Pending U.S. Appl. No. 14/972,139, filed Dec. 17, 2015, entitled: "Dynamic Password Generation", 39 pages.
Pending U.S. Appl. No. 15/417,882, filed Jan. 27, 2017, entitled: "Dynamic Password Generation", 39 pages.
Diaz-Tellez et al., "Context-Aware Multifactor Authenication Based on Dynamic Pin", IFIP Advances in AICT, vol. 428, 2014, pp. 330-338.
http://en.wikipedia.org/wike/Knowledge-based_authentication, "Knowledge-based Authentication", printed Nov. 20, 2015, 4 pages.
Threatmetrix, "Context-Based Authentication", White Paper, Copyright 2014, 10 pages.
Mell et al., "The NIST Definition of Cloud Computing", National Institute of Standards and Technology, Special Publication 800-145, Sep. 2011, pp. 1-7.
https://play.google.com/store/apps/details?id=com.newwave.comtimepasswordlockfree, "Screen Lock-Time Password", New Wave Studio, Apr. 14, 2015, pp. 1-3.
Non-Final Office Action: Mail date Apr. 29, 2016, U.S. Appl. No. 14/972,145, filed Dec. 17, 2015, pp. 1-26.
Final Office Action: Mail date Sep. 20, 2016, U.S. Appl. No. 14/972,145, filed Dec. 17, 2015, pp. 1-22.
Hayashi et al., "CASA: Context-Aware Scalable Authentication", Retrieved from http://www.cs.cmu.edu/~ehayashi/papers/soups2013_casa.pdf, Published Jul. 2013, pp. 1-11.
Preuveneers et al., "SmartAuth: Dynamic Context Fingerprinting for Continuous User Authentication", Retrieved from http://pdfs.semanticscholar.org/3797/eOc78368bf099e93f5e96230893923cf3f48.pdf, published Apr. 2015, pp. 1-7.
Assurance Technologies, LLC, "Passlib Documentation Release 1.6.2", https://media.readthedocs.org/pdf/passlib/1.6.2/passlib.pdf, Jul. 23, 2015, pp. 1-99.

* cited by examiner

DYNAMIC PASSWORD GENERATION

BACKGROUND

Embodiments of the invention relate generally to information security, and more particularly to automatic password generation and use.

Electronic information is often accessed using security credentials such as passwords. Maintaining password security in light of increasing threats is a challenge. One common way to increase password security is to require users to select passwords having a minimum strength requirement, for example, at least 8 characters, at least one number, at least one uppercase letter, and/or at least one special character. However, methods exist that may defeat such static passwords, including brute force attacks, social engineering, remote access tools (RATs) and keyloggers, phishing, and rainbow tables.

SUMMARY

Embodiments of the present invention disclose a computer-implemented method, system, and computer program product for providing access to electronic information.

In an embodiment of the invention, a first password string associated with a user, and a rule for configuring and generating a second password string from the first password string, are received from the user. The rule specifies a dynamic element to insert at a specified position in the first password string, based on first contextual information associated with the user. The value of the specified dynamic element is determined based on second contextual information associated with the user. When a third password string associated with the user is received, the second password string is configured and generated from the first password string, based on the rule, by: selecting the specified dynamic element based on the first contextual information; inserting the selected dynamic element in the first password string at the specified position; and determining the value of the selected dynamic element based on the second contextual information. If the third password string matches the second password string, access to the electronic information is granted.

DETAILED DESCRIPTION

Existing password systems are limited, for at least the following reasons: they are static and not automatically changed; changes require user input; passwords remain fixed length, even if they employ special characters; passwords remain static for a period of time; computer-generated passwords are usually complex strings that are difficult to remember; and increased password complexity may necessitate users recording the passwords on a medium (for example, pen and paper, or in unencrypted electronic notes or files), making unauthorized access to the password data more likely. Static passwords are typically stored in hashed form and not as plaintext, however a concerted effort, for example, using a rainbow table, may be able to crack such a password. A password policy that goes beyond stored, static passwords would provide added protection from security breaches.

A dynamic password allows a user to add dynamic elements to a static password based, for example, on contextual information associated with the user. The use of a dynamic password aims to make the static password more secure. Contextual elements that could be generated for inclusion in a dynamic password include the user's location, pin code, state, and current time, date, month, day of the week, etc. Rather than using a static password for authentication, the user enters a password that depends on the values of the dynamic elements, according to predefined patterns and/or rules. The server process that performs password authentication uses the same patterns and rules to generate the correct password and verifies that the user password and the server password match. Thus, a password entered one day may differ from a password entered by the same user for the same portal on another day. Nevertheless, the user will be authenticated as long as the patterns and rules that were established by the user are adhered to. This approach would defeat most current password cracking methods, as passwords generated in this manner may not have a constant length or type and are not stored in a form that represents a static string.

Embodiments of the present invention disclose a computer-implemented method, computer program product, and system for dynamic password generation. A user establishes a dynamic password, based on a first, static password string and one or more patterns and/or string generation rules, which are then stored in a password datastore. At login, the user enters a password that complies with the established dynamic password. A server process that performs password authentication receives the dynamic password from the user, retrieves the stored static password from the password datastore and converts it to a final password, based on the associated patterns and/or rules. If the password the user entered and the final password generated by the server match, the user is authenticated.

Figure 1:
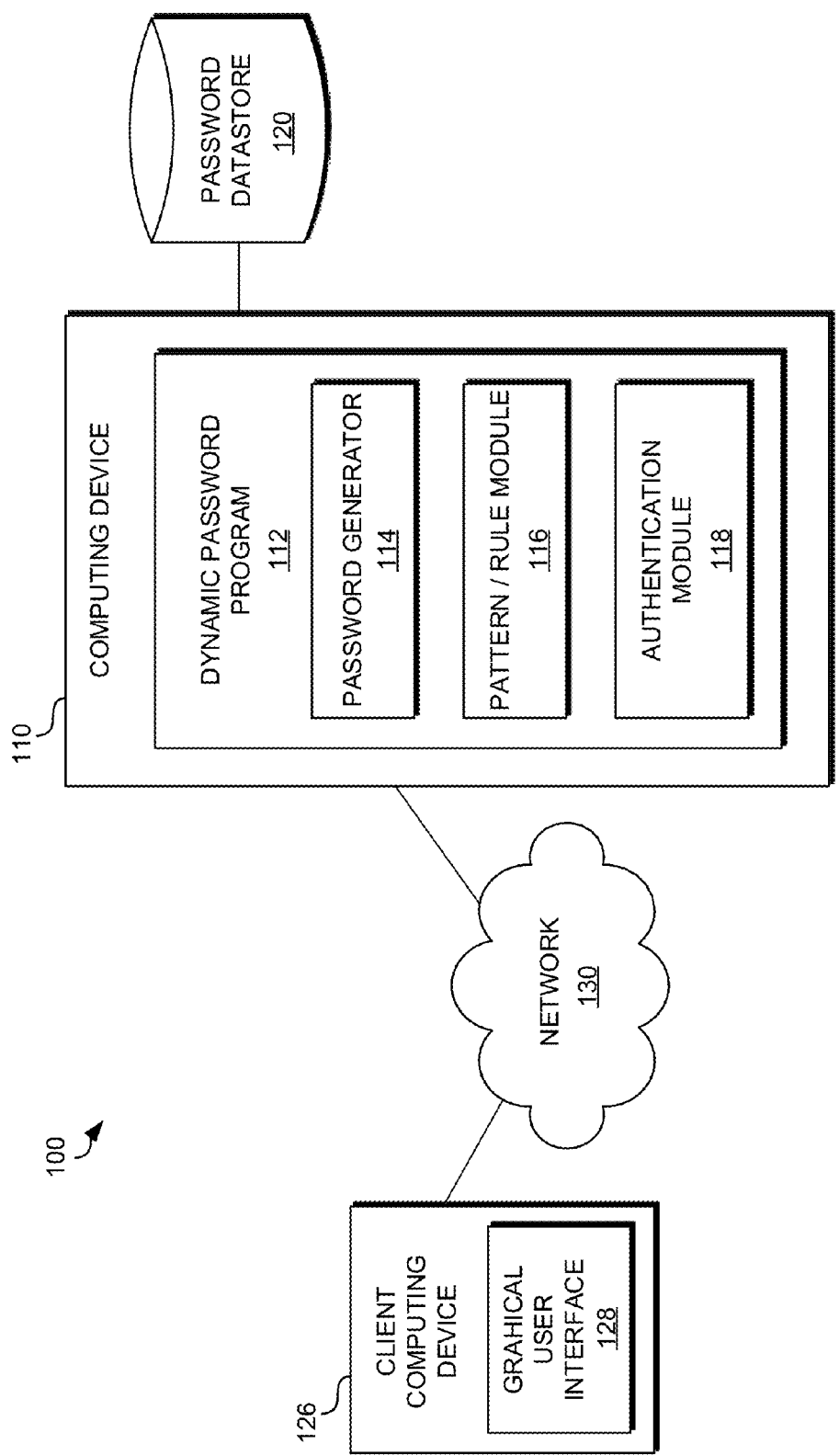
FIG. 1 is a functional block diagram of a dynamic password system, in accordance with an embodiment of the present invention.

FIG. 1 is a functional block diagram of a dynamic password system 100, in accordance with an embodiment of the present invention. Dynamic password system 100 includes computing device 110, shown hosting dynamic password program 112, password datastore 120, and client computing device 126, all interconnected over a network 130. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing device 110 represents the computing environment or platform that hosts dynamic password program 112. In various embodiments, computing device 110 may be a laptop computer, netbook computer, personal computer (PC), a desktop computer, or any programmable electronic device capable of hosting dynamic password program 112, described below, and communicating with client computing device 126 via network 130, in accordance with embodiments of the invention. Computing device 110 may include internal and external hardware components, as depicted and described in further detail below with reference to FIG. 7. In other embodiments, computing device 110 may be implemented in a cloud computing environment, as described in relation to FIGS. 8 and 9, below.

Figure 7:
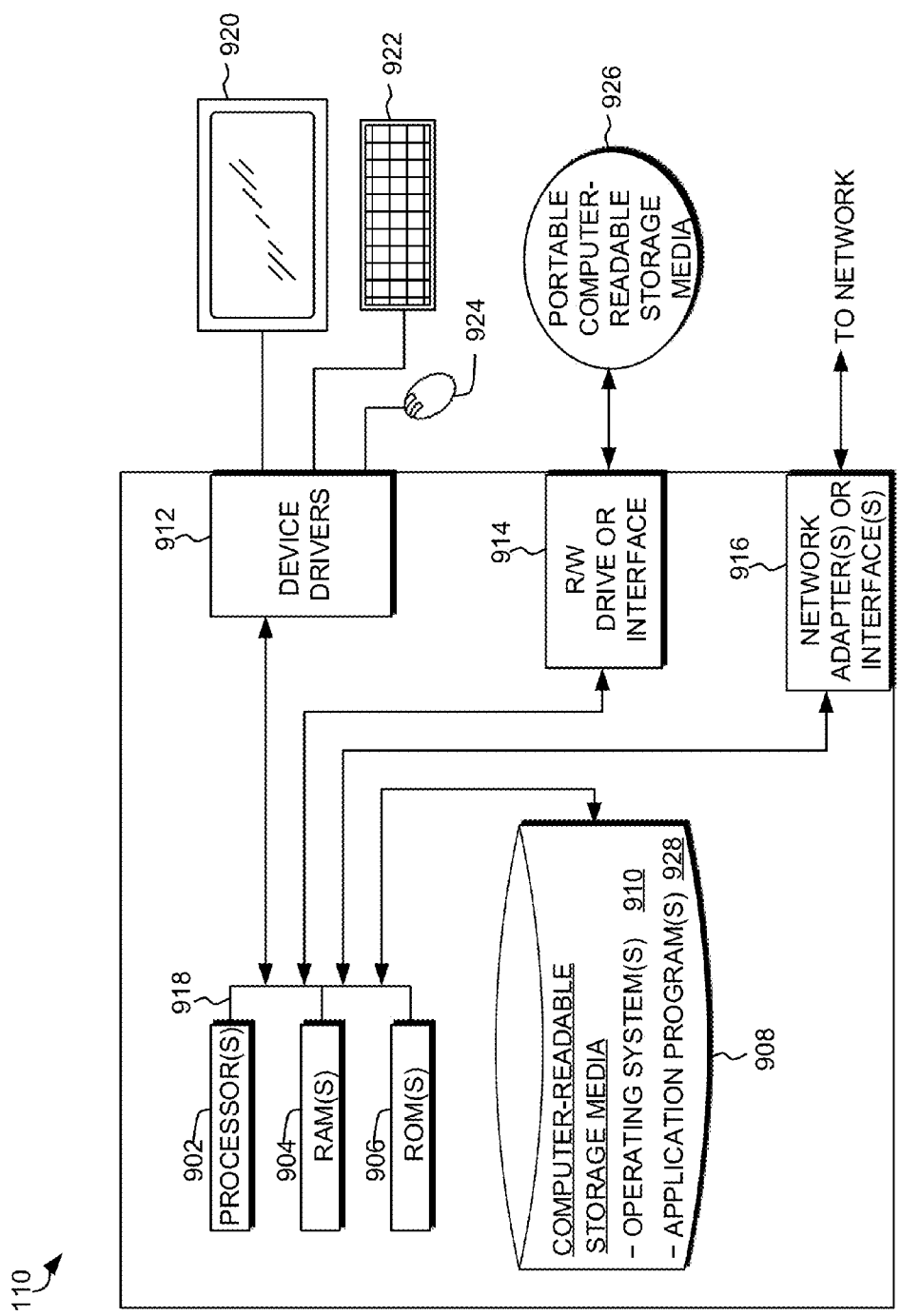
FIG. 7 is a block diagram of an exemplary computing device, according to an embodiment of the invention.

Password datastore 120 represents a store of data associated with user passwords, in accordance with an embodiment of the present invention. For example, password datastore 120 may include a database of dynamic password patterns and rules associated with specific users. Password datastore 120 may reside, for example, on computer readable storage media 908 (FIG. 7).

In an exemplary embodiment, client computing device 126 represents a source of user password data and related instructions that is received by computing device 110. Client computing device 126 may include graphical user interface 128, which a user may employ to generate and use a dynamic password. In various embodiments, graphical user interface 128 may be, for example, a web browser that receives web pages transmitted by computing device 110, or a dedicated application that interfaces with dynamic password program 112 on computing device 110. In other embodiments, client computing device 126 may represent another device that interfaces with computing device 110 and is required to use password authentication.

In various embodiments of the invention, a client computing device 126 may be, for example, a laptop computer, tablet computer, netbook computer, personal computer (PC), a desktop computer, a personal digital assistant (PDA), or a smart phone. In general, a client computing device 126 may be any programmable electronic device capable of communicating with computing device 110 via network 130, and of supporting functionality as required by one or more embodiments of the invention. A client computing device 126 may include internal and external hardware components as depicted and described in further detail below with reference to FIG. 7.

Network 130 can be, for example, a local area network (LAN), a telecommunications network, a wide area network (WAN), such as the Internet, a virtual local area network (VLAN), or any combination that can include wired, wireless, or optical connections. In general, network 130 can be any combination of connections and protocols that will support communications between computing device 110, password datastore 120, client computing device 126, and the operation of dynamic password program 112, in dynamic password system 100, in accordance with embodiments of the present invention.

In an embodiment of the invention, computing device 110 includes dynamic password program 112. Dynamic password program 112 may further include password generator 114, pattern/rule module 116, and authentication module 118.

Dynamic password program 112 operates generally to receive information associated with login credentials of a user, including a static password string and one or more patterns and/or string generation rules, which it stores in password datastore 120. When a user subsequently enters a password as part of a login procedure, dynamic password program 112 retrieves the static password string, patterns, and rules associated with the user and uses them to generates a second password. If the password entered by the user and the generated second password match, the user may be granted access to the user's account.

Password generator 114 operates to generate a dynamic password from a static password string according to predefined patterns and/or string generation rules associated with a user, in accordance with an embodiment of the present invention, as described below.

Pattern/rule module 116 allows a user to define the patterns and/or rules that will be used with a dynamic password, in accordance with an embodiment of the present invention, as described below. Pattern/rule module 116 may store the patterns and/or rules in password datastore 120 and associate them with the user.

Figure 2:
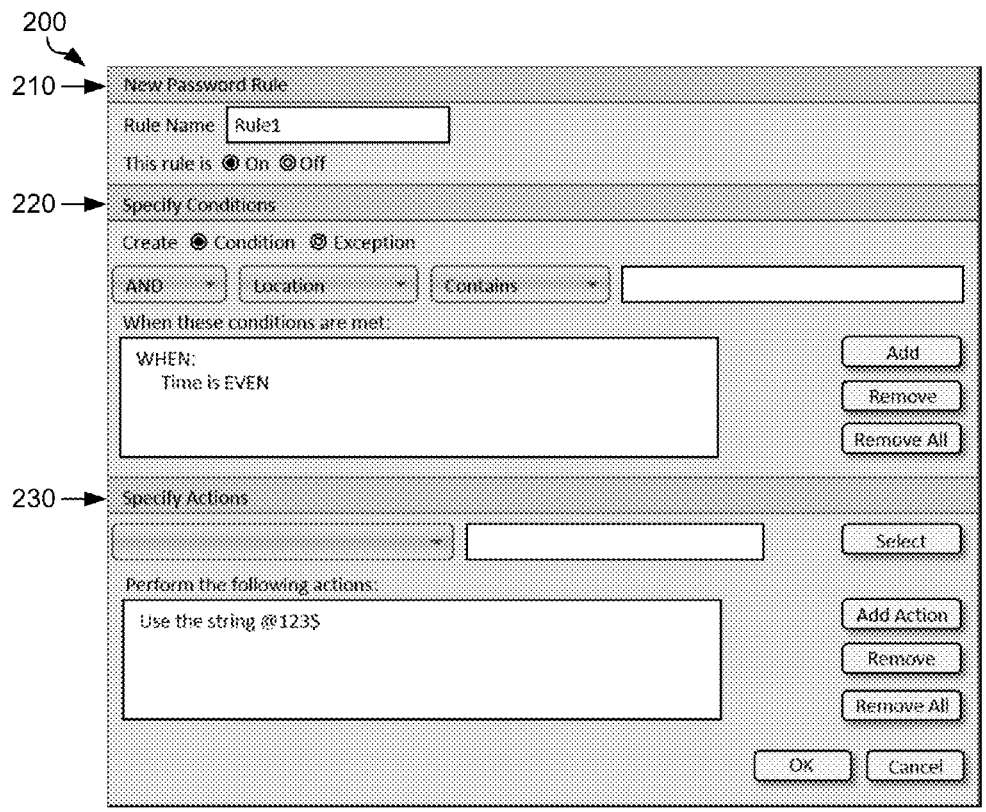
FIG. 2 is a diagram of an exemplary user interface for configuring rules in generating or using dynamic passwords, in accordance with an embodiment of the present invention.
Figure 3:
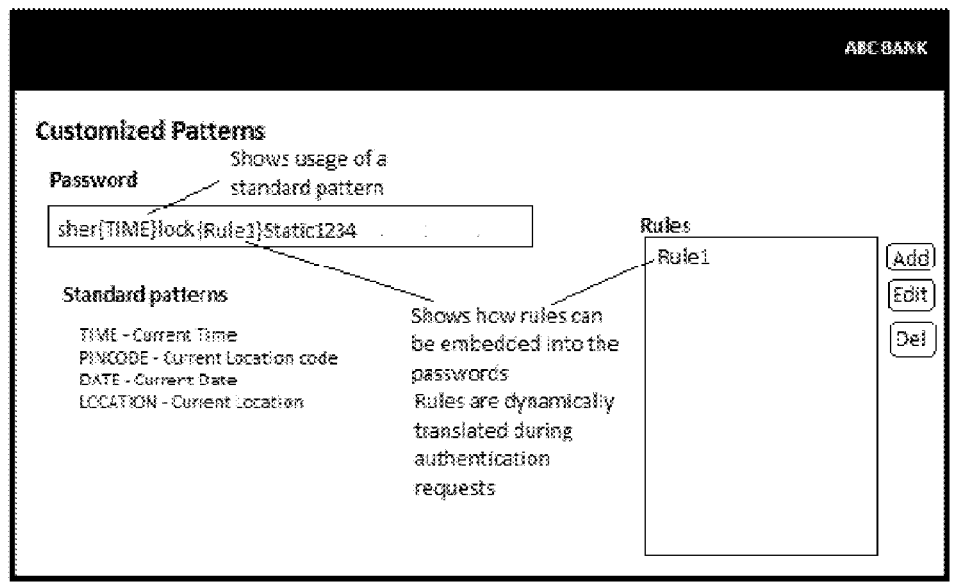
FIG. 3 is a diagram of an exemplary user interface for generating or using a dynamic password, in accordance with an embodiment of the present invention.

In one embodiment of the invention, a user defines patterns and/or rules for a dynamic password via pattern/rule module 116 by using a GUI, such as those shown in FIGS. 2 and 3, designed for this purpose. In another embodiment, pattern/rule module 116 may provide the user with one or more patterns that should be used when entering a password. For example, a user may log onto computing device 110 via client computing device 126, and enable dynamic password generation via a user setting. Once the setting is enabled, the user invokes pattern/rule module 116 to define the patterns and/or rules that will be used with the dynamic password.

A pattern refers to a predefined data element associated with a user, for example, contextual data, which is to be inserted at a specified position in a static password string. The specified position is referred to as a reference character position. A pattern is a simple example of a string generation rule, which is described in more detail below. For example, a user may define a pattern via the rule "sher{TIME}lock," indicating that the current time value (at login) is to be inserted in the name "sherlock," at the character position where the expression {TIME} appears in the dynamic password. Alternatively, the user may choose a specific, constant string value to use in the defined pattern.

Table 1 presents additional example password patterns that may be defined by the user:

TABLE 1

EXAMPLE PASSWORD PATTERNS

| PATTERN | PASSWORD | COMMENT |
| --- | --- | --- |
| sher{DAY}lock | sherMONDAYlock | User logs in on Monday |
| sher{GRIDB}lock | sher87lock | Bank provides grid card to the user (see below) |

TABLE 1-continued

EXAMPLE PASSWORD PATTERNS

| PATTERN | PASSWORD | COMMENT |
|---|---|---|
| sher{PINCODE}lock | sher560071lock | User supplies pin |
| sherlock{STATE}{PINCODE} | sherlockVERMONT560071 | User supplies state and pin |

In the above examples, the length, type, and patterns vary. This inconsistency prevents a hacker from guessing the actual password, based on assumptions about the length, type, or other characteristics of the password.

In accordance with an embodiment of the present invention, authentication module 118 receives a password entered by a user, compares the password with another password generated by password generator 114, and authenticates the user if the two passwords match.

For example, suppose that a user wishes to login to an account on a banking website at 4:20 p.m. via client computing device 126. The user is prompted for a user ID and a password. When prompted for a password, the user enters "sher1620lock". The password is then transmitted to authentication module 118 of dynamic password program 112, which in turn queries password datastore 120 to retrieve any predefined dynamic password patterns and/or rules associated with the user. Password generator 114 then generates the actual password, based on the retrieved patterns and/or rules. In this example, the pattern stored is sher{TIME}lock. So, since the user logged in at 4:20 p.m., the password generated by password generator 114 will be sher1620lock. Authentication module 118 checks for a match between the generated password and the user-entered password. If they match, the user is authenticated and may be given access to the account.

Whenever a user defines a pattern or rule for a dynamic password, pattern/rule module 116 may store the pattern or rule in password datastore 120 and associate it with the user. When authentication module 118 is subsequently called on to authenticate the user, it recognizes that a dynamic password is being used and requests that password generator 114 retrieve the stored rules and patterns in order to generate the actual password. Authentication module 118 allows access to the user's account, provided the received password and the generated password match.

Pattern/rule module 116 may facilitate the process of establishing patterns or rules by providing a graphical user interface (GUI) to customize the patterns which will be included in passwords. FIGS. 2 and 3 depict example GUIs that may allow a user to establish a dynamic password, in accordance with various embodiments of the invention.

FIG. 2 is a diagram of an exemplary user interface 200 for configuring rules in generating or using dynamic passwords, according to an embodiment of the invention. Through exemplary user interface 200, a user can create custom rules and determine when and under what circumstances they should be applied.

FIG. 2 illustrates how a user might define an example rule via exemplary user interface 200, according to an embodiment of the invention. New password pane 210 allows a user to assign a name to a rule, for example, Rule1, and to enable it or disable it. Specify conditions pane 220 allows the user to specify conditions under which Rule1, when enabled, is to be used in generating a dynamic password. Specify actions pane 230 allows the user to specify which actions are to be taken when Rule1 is encountered. In this case, Rule1 specifies a substitution string. The rule specified is: If the (login) time is 'even', i.e., the number of minutes is an even number, the user is expected to provide "@123$" as a substitute string. For example, the user may be required, for authentication purposes, to replace the expression {Rule1}, as shown in FIG. 3, below, with the string "@123$" wherever it appears in a dynamic password, provided the login time is even. Other, more complicated, rules are also contemplated. For example, a rule may be: If the location is Phoenix and the time is even, or the location is Boston and the time is odd, use the string "$123@".

In certain embodiments of the invention, a rule may be generated by a user from dynamic elements, as described above. In other embodiments, a rule may be selected from a predefined set of rules. For example, a list of predefined rules may be presented to a user in a dropdown list in a GUI.

FIG. 3 is a diagram of an exemplary user interface for generating and using a dynamic password, in accordance with an embodiment of the present invention. With the exemplary user interface a user may create a dynamic password that includes a static part and one or more dynamic elements. In an embodiment of the invention, each dynamic element may be defined via a rule or pattern. The static part and the dynamic elements may be stored in password datastore 120.

FIG. 3 illustrates how a dynamic password, incorporating both a pattern and a rule, may be defined. In this example, the static password string is sherlockStatic1234. The expression {TIME} represents a pattern that should be replaced by the current time at login. The expression {Rule1} represents a predefined string generation rule, such as the rule defined in FIG. 2, which specifies that if the time is even, then the expression {Rule1} should be replaced by the string "@123$" at the corresponding reference character position.

In various embodiments, patterns and/or rules for dynamic passwords may specify contextual content such as locations or pin codes, constant strings, or application-specific data such as grid values. Grid authentication is a method of securing user logins by requiring the user to enter values from specific cells in a grid whose content should be only accessible to the user and the service provider. The grid is typically on a card and consists of letters and numbers in rows and columns. For example, a rule could specify that under certain conditions configured by the user, a dynamic password should include or consist of a sequence of characters selected from grid cells that are specified during authentication. A rule may also specify the use of a one-time password (OTP), if the user is given an option to generate an OTP via the application. For example, a rule could specify that under certain conditions configured by the user, a dynamic password should include or consist of an OTP.

Figure 4:
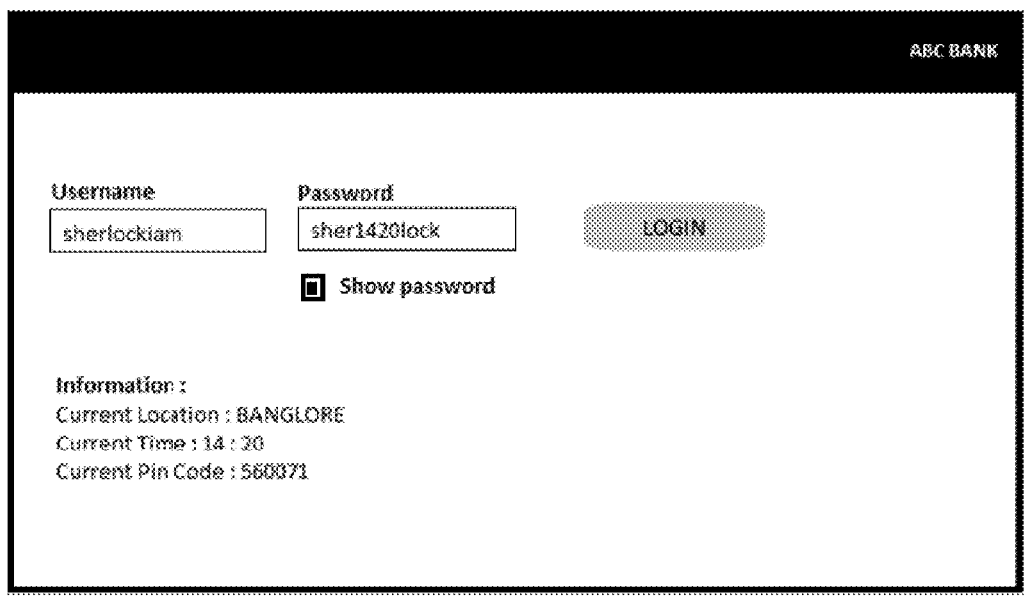
FIG. 4 is a diagram of a user interface for using a dynamic password, according to an embodiment of the invention.

The user may also be presented with the various options on the login screen to simplify the process of providing the password while logging in, as shown in FIG. 4. For example, the login GUI might display the time, place, user's pin code, etc., and the user could use these to generate the currently correct password.

FIG. 4 is a diagram of an example user interface for using a dynamic password, in accordance with an embodiment of the present invention. A user may log into an account through a login interface using dynamically generated information, based on predefined patterns and/or rules. For example, the dynamically generated information may include location, time, pin code, etc. The login information may be used by authentication module 118 to authenticate the user.

Figure 5:
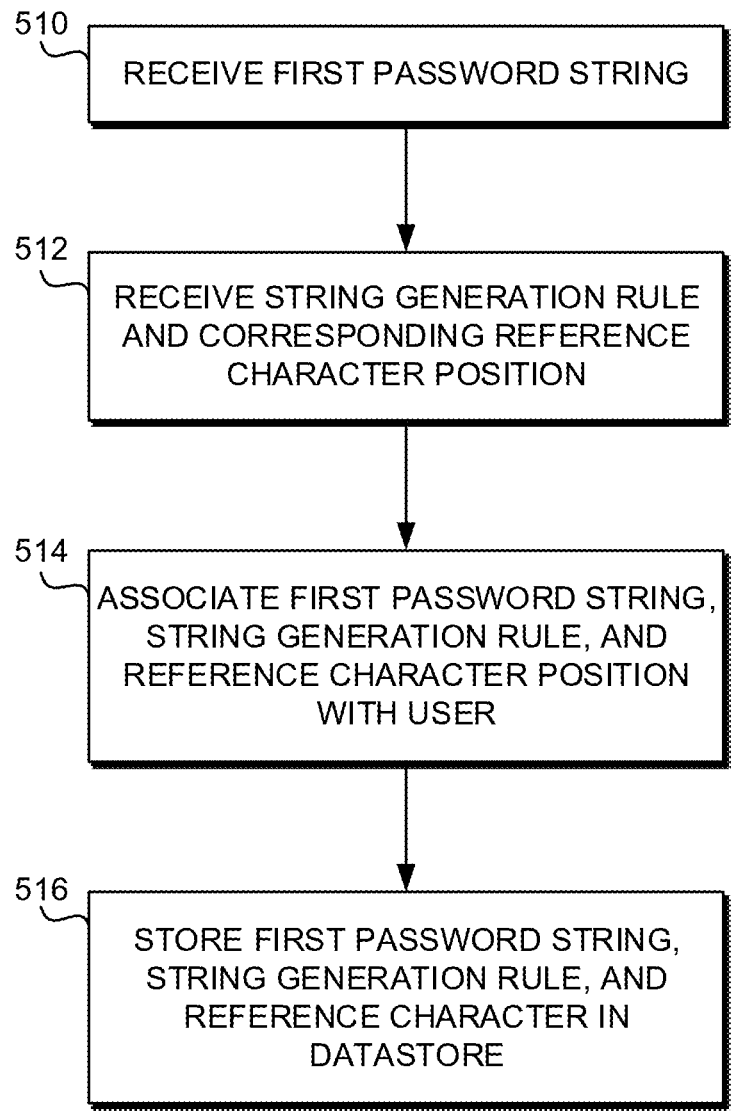
FIG. 5 is a flowchart depicting operational steps of a dynamic password program, in accordance with an embodiment of the present invention.

FIG. 5 is flowchart depicting various operational steps performed by computing device 110 in generating a dynamic password, in accordance with an embodiment of the invention. A user enters a first, static password string and one or more string generation rules, with corresponding reference character positions, through a user interface on a client computing device 126. Client computing device 126 transmits the password string, rules, and reference character positions to dynamic password program 112 on computing device 110. Dynamic password program 112 receives the static password string (step 510), and the string generation rules, with corresponding reference character positions (step 512). Dynamic password program 112 associates the static password string and the string generation rules, with corresponding reference character positions, with the user (step 514). Dynamic password program 112 stores the static password string, the string generation rules, and the corresponding reference character positions in password datastore 120 (step 516).

Figure 6:
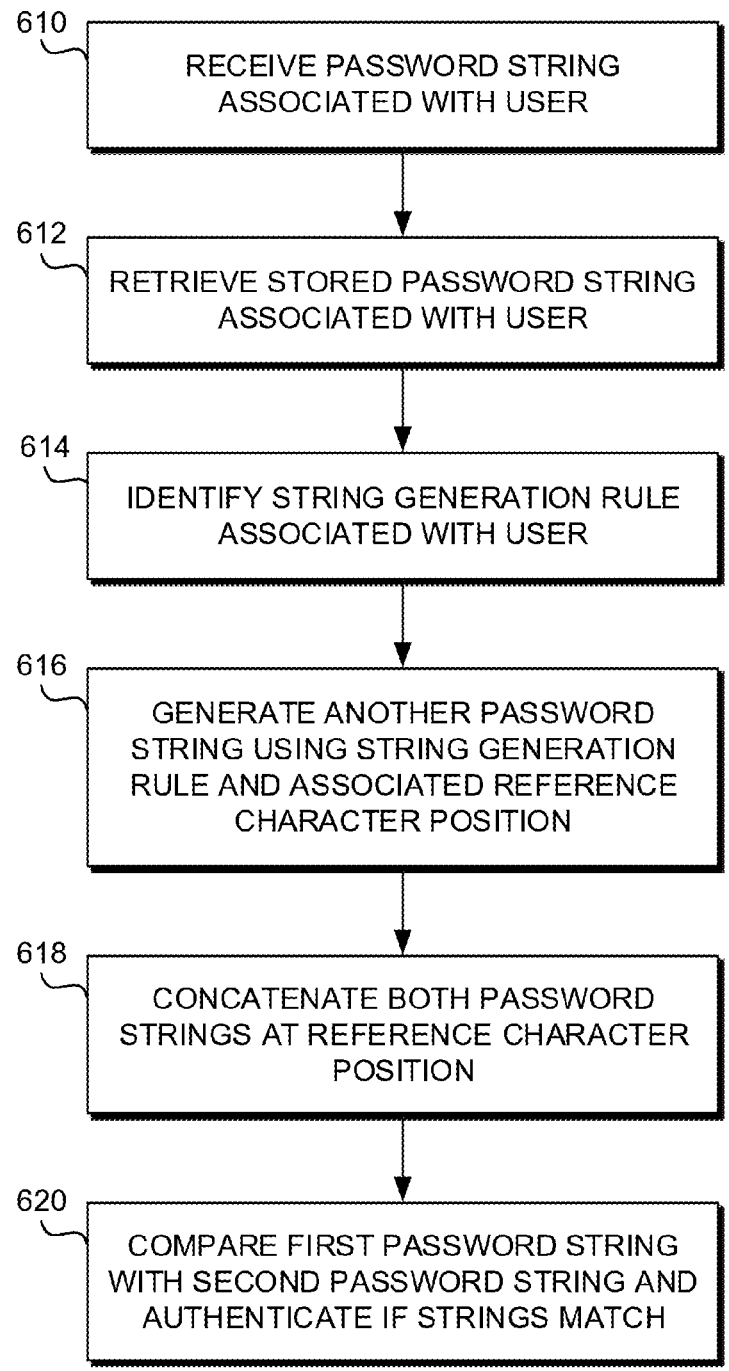
FIG. 6 is a further flowchart depicting further operational steps of a dynamic password program, in accordance with an embodiment of the present invention.

FIG. 6 is a flowchart depicting various operational steps performed by computing device 110 in authenticating a dynamic password, in accordance with an embodiment of the invention. A password string associated with a user is received (step 610). Password generator 114 retrieves a stored, static password string associated with the user from password datastore 120 (step 612). Password generator 114 identifies one or more string generation rules associated with the user, along with corresponding reference character positions (step 614). Password generator 114 generates further password strings using the string generation rules (step 616). Password generator 114 generates a final password string by concatenating the first string with the further password strings at the reference character positions (step 618). Authentication module 118 compares the password string received from the user with the final password string, and, if they match, authenticates the user (step 620).

FIG. 7 depicts a block diagram 900 of components of computing device 110 (FIG. 1), in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, dynamic password program 112 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 914 to read from and write to one or more portable computer readable storage media 926. Application programs 928 on client computing device and/or computing device 110 may be stored on one or more of the portable computer readable storage media 926, read via the respective R/W drive or interface 914 and loaded into the respective computer readable storage media 908.

Computing device 110 may also include a network adapter or interface 916, such as a TCP/IP adapter card or wireless communication adapter (such as a 4G wireless communication adapter using OFDMA technology). Application programs 928 on computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
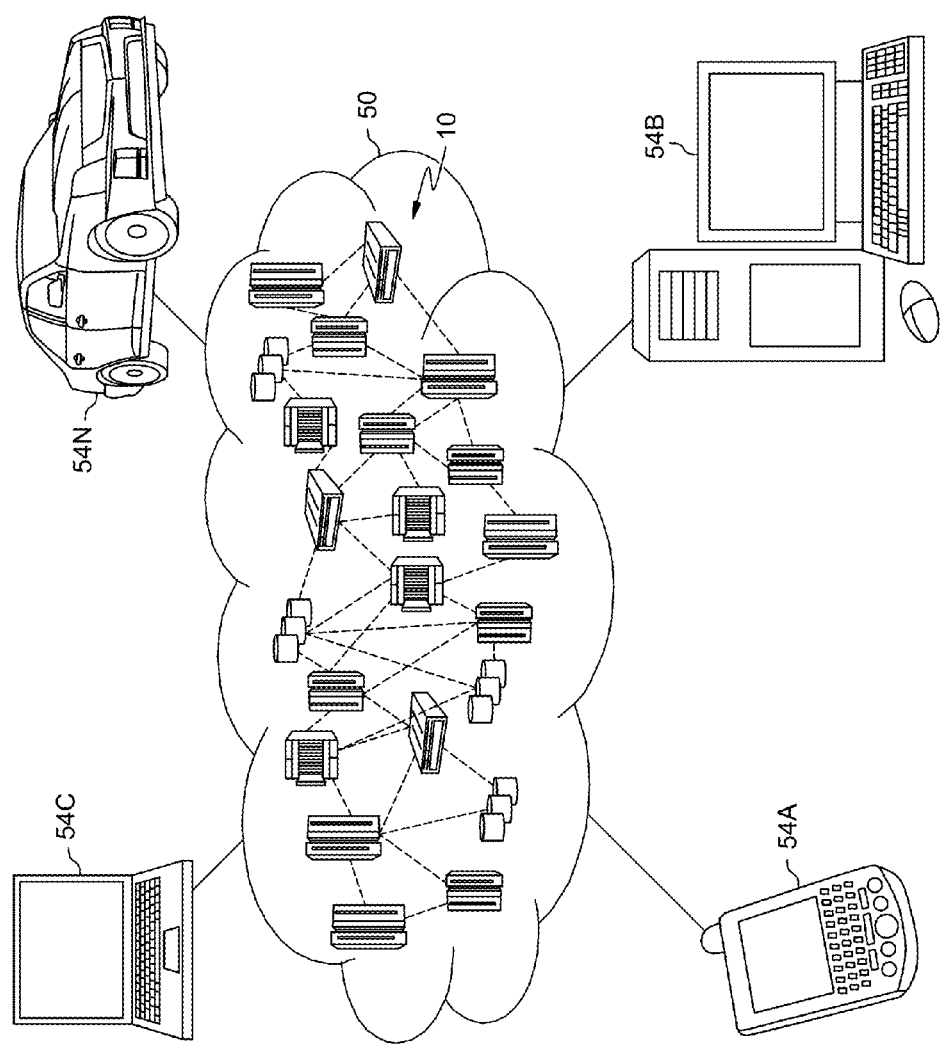
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
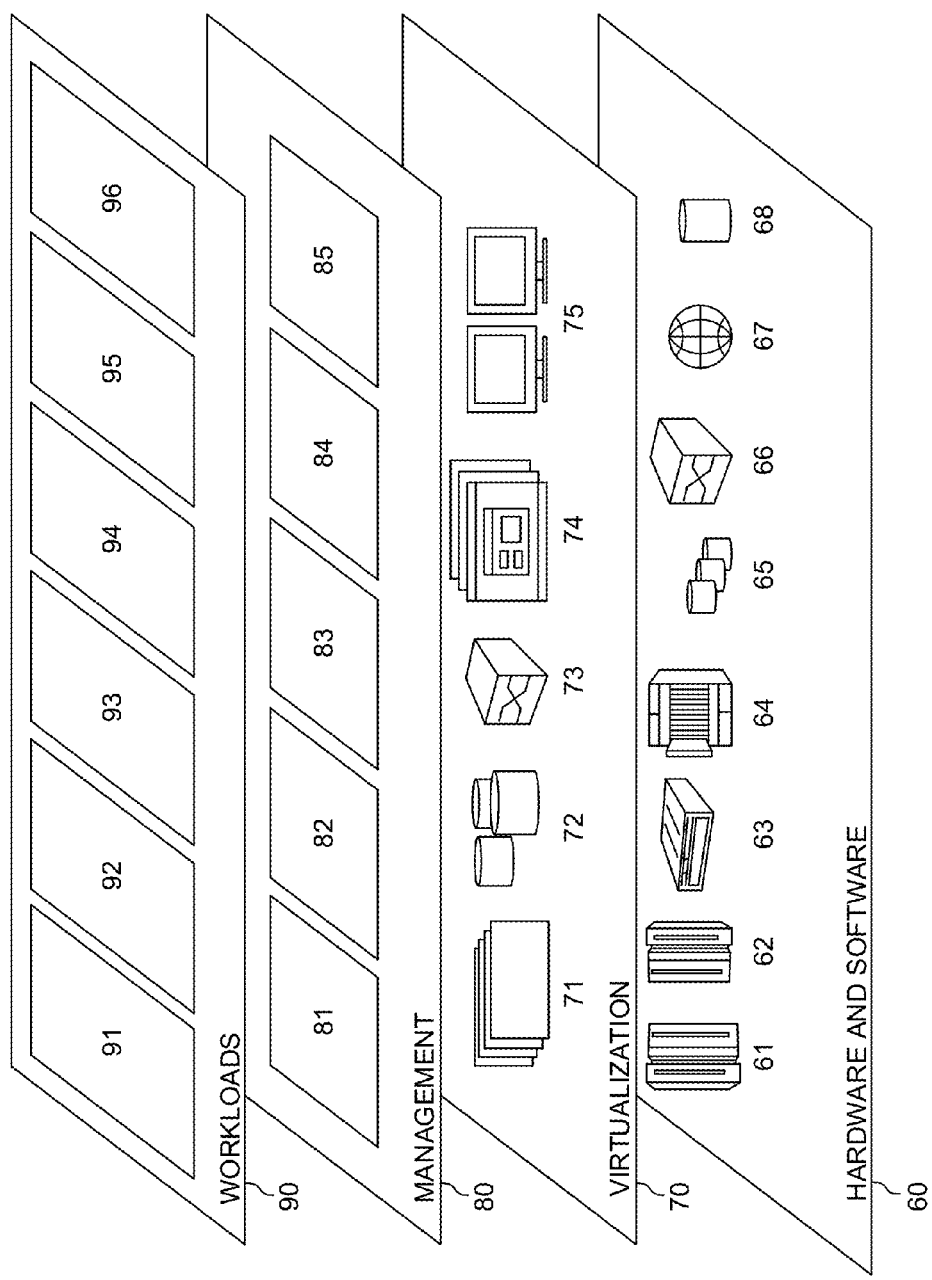
FIG. 9 depicts abstraction model layers of the cloud computing environment of FIG. 8 according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic password program 96.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer system for providing access to electronic information, the system comprising:
    a computer, a computer-readable storage medium, and program instructions stored on the computer-readable storage medium, which when executed cause the computer to perform a method comprising:
    receiving, by a first computer from a second computer over a network, in response to information entered into a user interface on the second computer, a first password string associated with a user and a rule for configuring and generating a second password string from the first password string, wherein the rule specifies a dynamic element to insert at a specified position in the first password string, based on first contextual information associated with the user, and wherein a value of the specified dynamic element is determined based on second contextual information associated with the user;
    in response to receiving, by the first computer from the second computer over the network, a third password string associated with the user, via information entered into the user interface on the second computer:
        configuring and generating, by the first computer, the second password string from the first password string, based on the received rule, by:
            selecting the specified dynamic element based on the first contextual information associated with the user;
            inserting the selected dynamic element in the first password string at the specified position; and
            determining the value of the selected dynamic element based on the second contextual information associated with the user; and
    in response to determining, by the first computer, that the third password string matches the second password string, granting, by the first computer, the second computer access to the electronic information.

2. A computer system in accordance with claim 1, the method further comprising:
    storing, by the first computer, the first password string and the rule for configuring and generating a second password string from the first password string in a datastore.

3. A computer system in accordance with claim 1, wherein the first computer is selected from the group consisting of a mobile computing device and a cloud computing node.

4. A computer system in accordance with claim 1, wherein the second computer is selected from the group consisting of a mobile computing device and a cloud computing node.

5. A computer system in accordance with claim 1, wherein the rule for configuring and generating a second password string includes a string generation rule for generating a string at a corresponding reference character position of the first password string, based on the second contextual information associated with the user.

6. A computer system in accordance with claim 5, wherein the string generation rule includes a pattern, which specifies that second contextual information associated with the user is to be inserted at the corresponding reference character position of the first password string.

7. A computer system in accordance with claim 1, wherein the first contextual information associated with the user and the second contextual information associated with the user comprise, respectively, one or more information selected from the group consisting of:
    a location, a time, a date, a month, a day of the week, a pin code, a predefined constant character string, a character sequence based on a grid card, and a one-time password.

8. A computer system in accordance with claim 1, wherein the rule for configuring and generating a second password string comprises a rule selected from the group consisting of:
    a rule defined by the user and a rule selected from a predefined set of rules.

9. A computer program product for providing access to electronic information, the program product comprising:
    a computer-readable storage medium and program instructions stored on the computer-readable storage medium, the program instructions, when executed by a computer, cause the computer to perform a method comprising:
    receiving, by a first computer from a second computer over a network, in response to information entered into a user interface on the second computer, a first password string associated with a user and a rule for configuring and generating a second password string from the first password string, wherein the rule specifies a dynamic element to insert at a specified position in the first password string, based on first contextual information associated with the user, and wherein a value of the specified dynamic element is determined based on second contextual information associated with the user;
    in response to receiving, by the first computer from the second computer over the network, a third password string associated with the user, via information entered into the user interface on the second computer:
        configuring and generating, by the first computer, the second password string from the first password string, based on the received rule, by:
            selecting the specified dynamic element based on the first contextual information associated with the user;
            inserting the selected dynamic element in the first password string at the specified position; and determining the value of the selected dynamic element based on the second contextual information associated with the user; and in response to determining, by the first computer, that the third password string matches the second password string, granting, by the first computer, the second computer access to the electronic information.

10. A computer program product in accordance with claim 9, the method further comprising:
storing, by the first computer, the first password string and the rule for configuring and generating a second password string from the first password string in a datastore.

11. A computer program product in accordance with claim 9, wherein the first computer is selected from the group consisting of a mobile computing device and a cloud computing node.

12. A computer program product in accordance with claim 9, wherein the second computer is selected from the group consisting of a mobile computing device and a cloud computing node.

13. A computer program product in accordance with claim 9, wherein the rule for configuring and generating a second password string includes a string generation rule for generating a string at a corresponding reference character position of the first password string, based on the second contextual information associated with the user.

14. A computer program product in accordance with claim 13, wherein the string generation rule includes a pattern, which specifies that second contextual information associated with the user is to be inserted at the corresponding reference character position of the first password string.

15. A computer program product in accordance with claim 9, wherein the first contextual information associated with the user and the second contextual information associated with the user comprise, respectively, one or more information selected from the group consisting of:
a location, a time, a date, a month, a day of the week, a pin code, a predefined constant character string, a character sequence based on a grid card, and a one-time password.

16. A computer program product in accordance with claim 9, wherein the rule for configuring and generating a second password string comprises a rule selected from the group consisting of:
a rule defined by the user and a rule selected from a predefined set of rules.

* * * * *